(12) United States Patent
Simon et al.

(10) Patent No.: US 8,202,620 B2
(45) Date of Patent: Jun. 19, 2012

(54) PERMANENT COATING OF SURFACES FOR INHIBITING AND/OR PREVENTING THEM FROM ICING UP, AND USE FOR THAT PURPOSE

(75) Inventors: Frank Simon, Dresden (DE); Manfred Stamm, Freital (DE); Katja Kretschmer, Reichenbach (DE); Petra Uhlmann, Dresden (DE); Ralf Frenzel, Dresden (DE)

(73) Assignee: Leibniz-Institut fuer Polymerforschung Dresiden E.V., Dresden (DE)

( * ) Notice: Subject to any disclaimer, the term of this patent is extended or adjusted under 35 U.S.C. 154(b) by 329 days.

(21) Appl. No.: 12/519,044

(22) PCT Filed: Dec. 12, 2007

(86) PCT No.: PCT/EP2007/063852
§ 371 (c)(1),
(2), (4) Date: Jun. 12, 2009

(87) PCT Pub. No.: WO2008/071752
PCT Pub. Date: Jun. 19, 2008

(65) Prior Publication Data
US 2010/0086789 A1    Apr. 8, 2010

(30) Foreign Application Priority Data
Dec. 13, 2006  (DE) .......................... 10 2006 060 340

(51) Int. Cl.
B32B 17/10   (2006.01)
B32B 15/082  (2006.01)
B05D 1/36    (2006.01)

(52) U.S. Cl. ...................... 428/442; 427/256; 427/388.1; 427/389.7; 427/407.1; 428/441; 428/461; 428/463

(58) Field of Classification Search .................. 427/256, 427/388.1, 389.7, 407.1; 428/441, 442, 461, 428/463
See application file for complete search history.

(56) References Cited

U.S. PATENT DOCUMENTS

| | | | |
|---|---|---|---|
| 5,045,599 A | 9/1991 | Murase | 525/102 |
| 6,150,459 A | 11/2000 | Mayes et al. | 525/54.1 |
| 6,207,749 B1 | 3/2001 | Mayes et al. | 524/731 |
| 6,534,157 B1 * | 3/2003 | Baker et al. | 428/195.1 |
| 2002/0139956 A1 | 10/2002 | Simendinger, III et al. | 252/70 |
| 2006/0194145 A1 * | 8/2006 | Irvine et al. | 430/270.1 |

FOREIGN PATENT DOCUMENTS

| | | |
|---|---|---|
| EP | 0 339 583 A2 | 11/1989 |
| WO | 94/21701 A1 | 9/1994 |
| WO | 02/090459 A1 | 11/2002 |

OTHER PUBLICATIONS

Pierburg, Elektrische Kraftstoffpumpen: Service Tipps & Infos, First edition, Aug. 2006, pp. 1-51, including a partial translation of p. 27.
Ewart et al., Cell. Mol. Life Sci., vol. 55, pp. 271-283, 1999.
Harding et al., Eur. J. Biochem., vol. 264, pp. 653-665, 1999.
Inada et al., Cryst. Growth Des., vol. 3, No. 5, pp. 747-752, 2003.
Popescu et al., "The Patterning and Alignment of Muscle Cells Using the Selective Adhesion of Poly (oligoethylene glycol methyl ether methacrylate)-based ABA Block Copolymers," Advanced Materials, vol. 17, pp. 2324-2329, XP002476668, 2005.
International Search Report issued with respect to PCT/EP2007/063852, mailed May 8, 2008.
Schwabe, Physikalische Chemie, vol. 1, Akademie-Verlag, Berlin, p. 341, et seq. 1986, and English language translation of Summary.

* cited by examiner

*Primary Examiner* — D. S. Nakarani
(74) *Attorney, Agent, or Firm* — Greenblum & Bernstein, P.L.C.

(57) ABSTRACT

The invention refers to the fields of chemistry and mechanical engineering, relates to a permanent coating, which have a functionalization of the surfaces for the avoidance or reduction of ice growth on this surface. The object of the present solution is to disclose a permanent coating that is durable and reliably inhibits and/or prevents an icing of the surface. The object is attained through a permanent coating of surfaces for inhibiting and/or preventing icing down to ambient temperatures of $-10°$ C., in which the coating comprises polymers with main chains and side chains, wherein the polymer main chains are hydrophobic and the side chains are hydrophilic and the polymer main chains have entered into a chemical and/or chemically-coordinative and/or physical interaction with the surface to be coated and the side chains are arranged on the polymer main chain essentially in the direction away from the surface and at least do not permanently interact with one another.

21 Claims, No Drawings

PERMANENT COATING OF SURFACES FOR INHIBITING AND/OR PREVENTING THEM FROM ICING UP, AND USE FOR THAT PURPOSE

The invention refers to the fields of chemistry and mechanical engineering, relates to a permanent coating of surfaces for inhibiting and/or preventing icing, which have a functionalization of the surfaces for the avoidance or reduction of ice growth on this surface, which can be, for example, a coating on the surface of heat exchangers, air conditioners, ice machines, aircraft wings.

The equipment of surfaces with coatings that inhibit or prevent an icing with a cooling of the moist ambient air below 0° C. is known according to the prior art. Based on known examples from nature, so-called anti-freeze proteins are used to influence crystalline growth, so that ice crystals are prevented from sticking to the surface (K.V. Ewart, et al.: Cell. Mol. Life Sci. 55 [1999] 271-283; M.M. Harding, et al.: Eur. J. Biochem. 264 [1999] 653-665). This natural principle can also be used for technical applications, but is not very practicable due to the high cost of these proteins. According to WO 02 090 459, an attempt is made to simulate one aspect of the mode of action of anti-freeze proteins through a heterogeneous surface with at least two chemically and physically different components that are distributed regularly or randomly. The polar areas formed (nucleation points for ice formation) with high surface energy are surrounded by nonpolar islands of lower surface energy, whereby the formation of a compact ice layer is to be prevented. With this concept the deicing of the surface is facilitated, but the icing is not prevented.

The principle of the freezing-point depression is also known, in which substances are dissolved in a liquid and the freezing point of the liquid is lowered thereby (de-icing salt effect). The important factor thereby is not the type of dissolved substances, but essentially the quantity of these substances dissolved (K. Schwabe: *Physikalische Chemie*, Vol. 1, Akademie-Verlag, Berlin [1986] p. 341 et seq.)

It is also known that low proportions of dissolved polymers, such as, e.g., polyvinyl alcohol (T. Inada, S. S. Lu: Cryst. Growth Des. 3 [2003] 747-752) or low-molecular weight organic compounds, such as e.g., glycerol or diethylene glycol monomethyl ether (A. Zeman: *Chemie der Kraft- und Schmierstoffe* under http://www.unibw-muenchen.de/campus/MB/we6/zeman/kraftstoffe/zeman_kraftstoffe.htm) can substantially lower the freezing point of water. The use of diethylene glycol monomethyl ether as dissolved anti-icing additive in motor fuels and aviation turbine fuels is known and is used in many ways.

The disadvantage with the known solutions for inhibiting and/or preventing icing on surfaces is that it has not hitherto been possible to achieve permanent coatings that permanently prevent a frosting and/or icing of the surface.

The object of the present solution is to disclose a permanent coating of surfaces for inhibiting and/or preventing icing, which coating is durable and reliably inhibits and/or prevents an icing of the surface.

The object is attained through the invention disclosed in the claims. Advantageous embodiments are the subject matter of the subordinate claims.

With the permanent coating of surfaces for inhibiting and/or preventing icing down to ambient temperatures of −10° C. according to the invention, the coating comprises polymers with main chains and side chains, wherein the polymer main chains are hydrophobic and the side chains are hydrophilic and the polymer main chains are chemical and/or chemically-coordinative and/or physically interacting with the surface to be coated and the side chains are arranged on the polymer main chain essentially in the direction away from the surface and at least do not permanently interact with one another.

Advantageously, metal surfaces or glass surfaces are coated as surfaces.

Likewise advantageously, the coating comprises polyelectrolytes and polymers with uncharged hydrophilic groups, wherein even more advantageously the coating comprises polyalkylene glycols and copolymers thereof, poly(vinylamine)s and copolymers thereof, poly(ethylene imine)s and copolymers thereof, chitosan and other polysaccharides, poly(styrene sulfonic acid), salts thereof and copolymers thereof, polyacrylic acid, esters, salts and copolymers thereof, polymethacrylic acid, esters, salts and copolymers thereof or polylysine.

Also advantageously, the coating comprises methacrylate copolymers with poly(ethylene glycol) side chains, the average molar mass $M_n$ of which is between 100 and 10000 g/mol.

Furthermore advantageously, the polymers have a comb-like structure, wherein the polymer main chain forms the rear of the comb and the side chains form the teeth of the comb, and wherein even more advantageously the polymer main chain is bonded to the surface via adhesive groups and/or anchor groups.

It is also advantageous if the surface to be coated is pre-coated with a polymer monolayer or a weakly crosslinked hydrogel layer.

It is likewise advantageous if the surface to be coated is first coated with a monolayer of polymers via chemical and/or physical interactions between the polymer main chain and the surface, subsequently a further monolayer of the same polymer structure extends with its side chains into the spaces between the side chains of the first monolayer and are connected thereto via chemical and/or physical interactions, and subsequently further polymer main chains of a polymer of the same structure are bonded via chemical and/or physical interactions to the free polymer main chains.

It is furthermore advantageous if crystallization-influencing functional groups are bonded to the polymer main chains and/or to the side chains.

The permanent coating of surfaces of polymers with a comb-like structure according to the invention, wherein the hydrophobic polymer main chain forms the rear of the comb and the hydrophilic side chains form the teeth of the comb, is used according to the invention for inhibiting and/or preventing the icing of the coated surfaces down to ambient temperatures of −10° C.

Advantageously, the coating is used to coat metal surfaces or glass surfaces.

Likewise advantageously, polyelectrolytes and polymers with uncharged hydrophilic groups are used as polymers with a comb-like structure.

Furthermore advantageously, polyalkylene glycols and copolymers thereof, poly(vinylamine)s and copolymers thereof, poly(ethylene imine)s and copolymers thereof, chitosan and other polysaccharides, poly(styrene sulfonic acid), salts thereof and copolymers thereof, polyacrylic acid, esters, salts thereof and copolymers thereof, polymethacrylic acid, esters, salts and copolymers thereof or polylysine are used.

Also advantageously, a coating of methacrylate copolymers with poly(ethylene glycol) side chains is used, the average molar mass $M_n$ of which is between 100 and 10000 g/mol.

It is furthermore advantageous if polymers with adhesive groups and/or anchor groups are used for via chemical and/or chemically-coordinative and/or physically sorptive bonding to the surface.

Furthermore it is advantageous if a crosslinked hydrogel layer is used as a layer on the permanent coating.

And it is also advantageous if a coating is used, which made of a first monolayer of polymers with a comb-like structure subsequently made of a further monolayer of the same polymer structure, wherein the side chains of the second monolayer extend into the spaces between the side chains of the first monolayer.

It is also advantageous if polymers with crystallization-influencing functional groups are used.

With the solution according to the invention a simple and cost-effective coating of surfaces is possible, which inhibits and/or prevents permanently and reliably the icing of the surfaces.

This is carried out by the special structure of the polymers that form the coating. The partially water-soluble polymers have a polymer main chain, to which a plurality of hydrophilic side chains is bonded. After the application of the polymer to a surface, the side chains thereby all point essentially in one direction away from the main chain and away from the surface. A comb-like structure of the polymers is present. During the coating a bonding of the polymer main chains to the surface takes place via chemical and/or chemically-coordinative and/or physical interactions. The polymer molecules are thereby permanently fixed to the surface. The side chains arranged analogously to the teeth of a comb—as described above—all point away from the surface and are essentially freely moveable in the space near the surface. They do not thereby enter into a permanent interaction with the adjacent side chains.

As soon as the coated surface comes into contact with water or moist air, the free-standing hydrophilic side chains are solvated, so that directly above the polymer main chains, i.e., in the area of the solid/liquid or solid/gaseous boundary layer area, the water still remains liquid or an air layer is present even when the temperature falls below 0° C. to −10° C., while an ice formation can occur in the area further away from the surface. Due to this small liquid film or air film in the solid/liquid or solid/gaseous boundary layer area, even ice already formed cannot adhere to the surface, will fall off or can be easily removed, for example, with the flowing liquid or flowing air.

The principle according to the invention functions only when the ambient temperature does not fall below −10° C., since otherwise even the water layer remaining liquid longer or the moisture still present in the air layer directly above the polymer main chains, i.e., in the solid/liquid or solid/gaseous boundary layer area freezes and thus can no longer fulfill the function according to the invention.

The coating according to the invention can be qualitatively improved further through the use of crystallization-influencing functional groups which are present bonded to the polymer main chain or the side chains and impede the growth of ice crystals.

The difference between the present solution and solutions from the prior art is essentially that the use of the known effects is realized in a different chemical/physical environment, which has not previously been realized according to the prior art.

According to the prior art, the agent causing the respective freezing-point-lowering effect is always present in dissolved form.

According to the solution according to the invention, the agent that triggers the lowering of the freezing point is bonded in a fixed manner to a solid surface in the form of molecules or molecular ions. A free mobility of the molecules or molecular ions away from the solid surface is impossible.

The invention is explained in more detail below based on an exemplary embodiment.

EXAMPLE 1

Copper foil (sample pieces 50×80×0.5 mm$^3$) is purified with hydrogen peroxide solution in the ultrasonic bath (10 min), subsequently rinsed with ethanol and dried in the argon stream. A random copolymer of dimethylaminoethyl methacrylate (DMEMA) and poly[(ethylene glycol monomethyl ether)]methacrylate is used (PDMAEMA-graft-PEG-2.080, 5:1) for the coating. The coating is carried out by means of spin coating a polymer solution in a 10% ethanol solution. Polymer not bonded to the metal surface is removed by extraction with distilled water (4 days). The samples dried overnight in vacuum are subjected to a frosting test [thermostat −15° C., 88% relative air humidity, air temperature +1° C., substrate temperature −10 to −12° C., 20 min. frosting at 9 m/s (32.4 km/h), 5 min. separation at 23 m/s (82.8 km/h). A frost layer of approx. 250 μm thickness formed, while an uncoated comparison sample has a frost layer of approx. 650 μm.

The frost layer that is 250 μm thick can be easily removed by hand. The coating of the copper foil is stable. Even when the samples are stored under the effect of moisture for several weeks, no lessening of the effect was observed.

The invention claimed is:

1. An article, selected from the group consisting of one or more of heat exchangers, air conditioners, ice machines and aircraft wings, and comprising a surface coating, said coating comprising polymers with main chains and side chains, wherein the polymer main chains are hydrophobic and the side chains are hydrophilic and the polymer main chains have entered into a chemical and/or chemically-coordinative and/or physical interaction with a surface of said article and the side chains are arranged on the polymer main chain essentially in the direction away from the surface and do not permanently interact with one another.

2. The article according to claim 1, in which the article comprises a metal or glass surface.

3. The article according to claim 1, in which the polymers with main chains and side chains of the coating comprise polymers with uncharged hydrophilic groups and/or polyelectrolytes with uncharged hydrophilic groups.

4. The article according to claim 3, in which the coating comprises polyalkylene glycols and copolymers thereof, poly(vinylamine)s and copolymers thereof, poly(ethylene imine)s and copolymers thereof, chitosan and other polysaccharides, poly(styrene sulfonic acid), salts thereof and copolymers thereof, polyacrylic acid, esters, salts and copolymers thereof, polymethacrylic acid, esters, salts and copolymers thereof or polylysine.

5. The article according to claim 4, in which the coating comprises methacrylate copolymers with poly(ethylene glycol) side chains, the average molar mass $M_n$ of which is between 100 and 10000 g/mol.

6. The article according to claim 1, in which the polymers have a comb-like structure, wherein the polymer main chain forms the rear of the comb and the side chains form the teeth of the comb.

7. The article according to claim 6, in which the polymer main chain is bonded to the surface via adhesive groups and/or anchor groups.

8. The article according to claim 1, in which the surface to be coated is pre-coated with a polymer monolayer or a weakly crosslinked hydrogel layer.

9. The article according to claim 1, in which the article is pre-coated with a monolayer of polymers via chemical and/or physical interactions between the polymer main chain and the surface, subsequently a further monolayer of the same polymer structure extends with its side chains into the spaces between the side chains of the first monolayer and are connected thereto via chemical and/or physical interactions, and subsequently further polymer main chains of a polymer of the same structure are bonded via chemical and/or physical interactions to the free polymer main chains.

10. The article according to claim 1, in which the coating comprises crystallization-influencing functional groups bonded to the polymer main chains and/or to the side chains.

11. A method of inhibiting and/or preventing icing of an article down to ambient temperatures of −10° C. comprising applying to a surface of the article a coating, wherein the coating comprises polymers with a comb-like structure, wherein the hydrophobic polymer main chain forms the rear of the comb and the hydrophilic side chains form the teeth of the comb.

12. The method according to claim 11, wherein the article comprises a metal or glass surface.

13. The method according to claim 11, wherein the coating comprises polyelectrolytes with uncharged hydrophilic groups and/or polymers with uncharged hydrophilic groups as polymers with a comb-like structure.

14. The method according to claim 13, wherein the coating comprises polyalkylene glycols and copolymers thereof, poly(vinylamine)s and copolymers thereof, poly(ethylene imine)s and copolymers thereof, chitosan and other polysaccharides, poly(styrene sulfonic acid), salts thereof and copolymers thereof, polyacrylic acid, esters, salts and copolymers thereof, polymethacrylic acid, esters, salts and copolymers thereof or polylysine.

15. The method according to claim 14, wherein the coating comprises methacrylate copolymers with poly(ethylene glycol) side chains, the average molar mass $M_n$ of which is between 100 and 10000 g/mol.

16. The method of inhibiting and/or preventing icing of an article down to ambient temperatures of −10° C. according to claim 15, wherein the article is selected from the group consisting of heat exchangers, air conditioners, ice machines and aircraft wings.

17. The method according to claim 11, wherein the coating comprises polymers with adhesive and/or anchor groups for chemical and/or chemically-coordinative and/or physical sorptive bonding to the surface.

18. The method according to claim 11, comprising applying a crosslinked hydrogel layer on the coating.

19. The method according to claim 11, comprising applying on the surface of the article a first monolayer of polymers with a comb-like structure and subsequently a second monolayer of the same polymer structure, wherein the side chains of the second monolayer extend into the spaces between the side chains of the first monolayer.

20. The method according to claim 11, wherein the coating comprises polymers with crystallization-influencing functional groups.

21. The method of inhibiting and/or preventing icing of an article down to ambient temperatures of −10° C. according to claim 11, wherein the article is selected from the group consisting of heat, exchangers, air conditioners, ice machines and aircraft wings.

* * * * *